United States Patent [19]

Siefer et al.

[11] 4,384,563
[45] May 24, 1983

[54] APPARATUS FOR REDIRECTION OF FUEL-AIR MIXTURE IN CARBURETION SYSTEM

[75] Inventors: David A. Siefer, North Windham, Me.; Rande L. Martin, Richmond, Ind.

[73] Assignee: GTE Products Corporation, Stamford, Conn.

[21] Appl. No.: 277,775

[22] Filed: Jun. 26, 1981

[51] Int. Cl.³ .......................................... F02M 29/04
[52] U.S. Cl. .................................... 123/593; 123/590; 123/549
[58] Field of Search ............... 123/593, 590, 549, 536; 219/205, 206, 207

[56] References Cited

U.S. PATENT DOCUMENTS

| | | | |
|---|---|---|---|
| 3,934,569 | 1/1976 | Bobene | 123/593 |
| 3,952,716 | 4/1976 | McCauley | 123/593 |
| 4,020,805 | 5/1977 | Konomi et al. | 123/590 |
| 4,020,812 | 5/1977 | Hayward | 123/593 |
| 4,106,454 | 8/1978 | Henlis | 123/593 |
| 4,108,125 | 8/1978 | Marcoux et al. | 123/549 |
| 4,116,183 | 9/1978 | Hayward | 123/593 |

Primary Examiner—Charles J. Myhre
Assistant Examiner—E. Rollins Cross
Attorney, Agent, or Firm—Edward J. Coleman

[57] ABSTRACT

In an apparatus for preheating a fuel-air mixture mounted in the flow of that mixture between a carburetor and the intake manifold of a combustion engine wherein such mixture is passed through a multi-passaged PTC resistor heater into such engine manifold, a tab is provided which is mounted between the carburetor and the PTC resistor and proximate the latter. The tab projects into the flow of the fuel-air mixture to divert or redirect such flow through the PTC resistor and into the manifold to obtain a desired distribution of such mixture therein.

The redirection tab acts as a venturi which causes further mixing of such fuel-air mixture as it flows through such PTC resistor and such tab further has a baffle effect which redirects the fuel-air mixture as stated above.

16 Claims, 5 Drawing Figures

APPARATUS FOR REDIRECTION OF FUEL-AIR MIXTURE IN CARBURETION SYSTEM

BACKGROUND OF THE INVENTION

The present invention relates to an apparatus for preheating a fuel-air mixture between a carburetor and the intake manifold of a combustion engine, and more particularly, to adding a redirection means to such apparatus to guide the distribution of such mixture into the manifold.

In carburetion systems for automotive combustion engines, fuel and air are mixed in suitable porportions for delivery to the intake manifold of an engine for combustion. In such an arrangement, it is important that the fuel, e.g., gasoline, be vaporized as much as possible and mixed with the air to obtain maximum fuel efficiency and to minimize release of unburned hydrocarbon polutants to the atmosphere in the engine exhaust. However, particularly where the engine, at start-up, is cold and the fuel temperature is low, a significant portion of the fuel may not be vaporized and the air-fuel mixture delivered to the engine manifold can include droplets of liquid fuel with the resultant partial combustion of such fuel mixture and the increased polutants in the exhaust emissions referred to above.

Attempts have been made to improve the vaporization of the above fuel-air mixture by preheating the mixture before it enters the manifold. Accordingly, preheaters, including heaters formed of conductive material of positive temperature coefficient (PTC) of electrical resistivity, herein PTC resistors or heaters, have been employed. Typically, the heaters are multi-passaged PTC resistors having at least a pair of spaced electric contacts connected to e.g. a DC power source and current is directed through such PTC resistor to heat it and its passages and the fuel-air mixture passing therethrough, to provide a more complete evaporation of the liquid fuel in such mixture. See for example, U.S. Pat. No. 4,141,327 Marcoux et al (1979) and related U.S. Pat. No. 4,108,125 Marcoux et al (1978). For related and earlier prior art in which resistance heaters in the form of metal wires or grids are mounted in the flow of the fuel-pair mixture between a carbuetor and an engine manifold to preheat such mixture for fuel evaporation purposes, see U.S. Pat. No. 3,934,569 Bobene (1976) and U.S. Pat. No. 3,952,716 McCauley (1976).

For a baffled preheater chamber having a heat-exchange jacket mounted between a carburetor and an engine manifold, see U.S. Pat. No. 3,645,243 Ohlsson (1972). The baffle plates in the above chamber serve to create turbulance in the fuel-air mixture to assist the mixing thereof. The baffles provide no direction control for such mixture.

Accordingly, the fuel-air heaters of the prior art are concerned with immproved fuel evaporation of the mixture before it enters the engine manifold and make no suggestion of controlling the direction of such mixture as it enters the manifold. Accordingly such preheated mixture is often not accurately directed into the engine manifold so as to obtain uniform distribution of such mixture in the respective combustion chambers of the engine so that some chambers burn relatively lean (less fuel, more air) than other chambers of such engine, which can result in engine roughness and inefficiency of combustion. The adverse effects of misdirection of the fuel-air mixture into the engine manifold are exacerbated the more the carburetor discharge passage is mounted off-center relative to such intake manifold. Accordingly there is a need and market for a fuel-air mixture redirection apparatus which provides improved fuel-air distribution to the manifold and the respective combustion chambers thereof, and that substantially overcomes the prior art shortcomings.

In considering the above prior art fuel distribution problem, we considered constructing a baffle plate to be installed in the engine manifold to redirect the above fuel-air mixture. However, it was determined that such baffle plate would require installing an extra part in said manifold, and further, due to tooling requirements in mass production would be very expensive. Also considered was mounting a baffle to the underside of the fuel preheater which is mounted between the carburetor and the engine manifold. Again, this would require manufacturing an extra part and the additional step of mounting such baffle to project from the preheater in such a way as to redirect the fuel-air mixture, but not to block the flow thereof, an unsatisfactory and expensive alternative.

After review of such alternatives, the inventors discovered a low cost and effective apparatus to accurately redirect the fuel-air mixture, which apparatus can be readily manufactured in mass production.

There has now been discovered a structural member which can be added to a fuel preheater at low cost and ease of manufacture to provide a "baffle effect" to control fuel-air mixture direction and distribution and at the same time avoid problems inherent with construction and installation of baffle plates, as discussed above.

SUMMARY OF THE INVENTION

Accordingly, it is an object of this invention to direct a fuel-air mixture from a carburetor to an engine manifold for improved distribution in said manifold.

It is a further object of the present invention to provide a low cost and readily produced member which can redirect an fuel-air mixture from a carburetor to an engine manifold for improved distribution therein.

These and other objects, advantages and features are achieved, in accordance with the invention, by an improvement in an apparatus for preheating a fuel-air mixture mounted in the flow of such mixture between the carburetor and the intake manifold of a combustion engine. The apparatus includes, as a heating element, a PTC resistor having a plurality of open-ended passages, which passages are positioned to accommodate the flow therethrough of the above mixture into the manifold. The resistor is provided with means for directing current therethrough whereby the resistor is heated including the passages thereof so as to heat the fuel-air mixture passing therethrough. The improvement comprises a redirection means disposed in such flow proximate the above resistor, which serves to redirect the flow into the intake manifold to obtain a desired distribution of the fuel-air mixture therein.

By "PTC resistor" as used herein is meant, a heating element formed of an electrically conductive material having a positive temperature coefficient (PTC) of electrical resistivity.

The above PTC resistor is characterized by a relatively low electrical resistivity below a particular temperature, which displays an anomalous increase in electrical resistivity at or above the particular temperature, known herein as the "anomaly temperature".

By an "anomalous" increase in electrical resistivity is meant a sudden or steep increase in the electrical resistivity of the PTC material.

BRIEF DESCRIPTION OF THE DRAWINGS

The invention is further disclosed in the following detailed description and drawings in which.

DESCRIPTION OF PREFERRED EMBODIMENT

Figure 1:
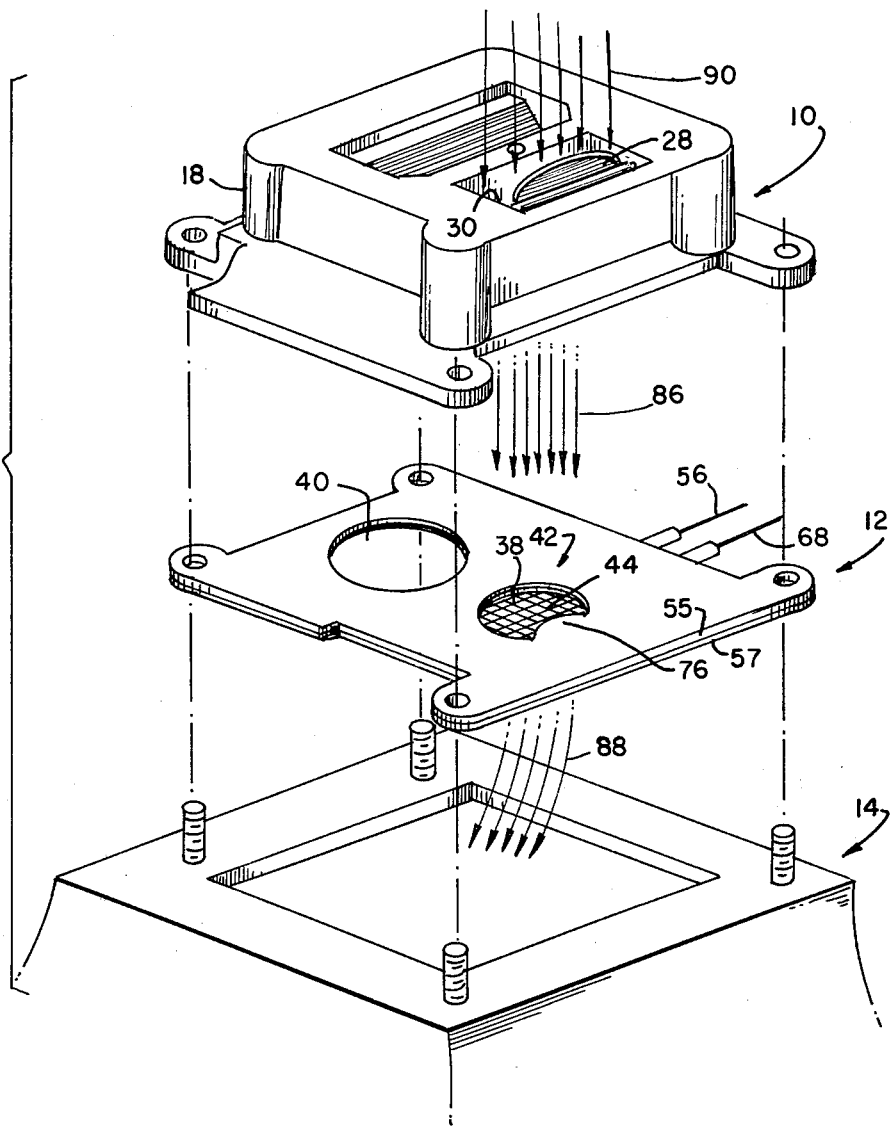
FIG. 1 is an exploded assembly perspective view of the fuel redirection and preheating apparatus embodying the present invention.
Figure 3:
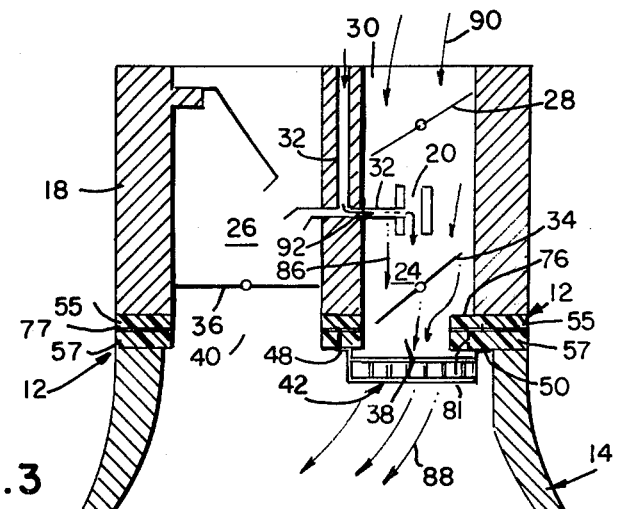
FIG. 3 is a sectional elevation view of the apparatus shown in FIG. 1, in assembly

Referring in more detail to the drawings, carburetor 10 is mounted on insulator assembly 12 which in turn, is mounted on intake manifold 14 of combustion engine 16, as shown in FIGS. 1 and 3. The carburetor 10 has housing 18, venturi 20, primary barrel 24 and secondary barrel 26, as shown in FIG. 3.

A choke valve 28 is pivotably mounted in the air intake port 30, proximate the liquid fuel inlet line 32 in the primary barrel 24, as shown in FIG. 3.

Pivotably mounted at the lower portion of the primary carburetor barrel 24, is throttle valve 34 and pivotably mounted in the lower portion of the secondary carburetor barrel 26, is throttle valve 36, as shown in FIG. 3.

The insulator assembly 12 has a pair of apertures 38 and 40, which align and are in substantial registration respectively with the primary carburetor barrel 24 and the secondary carburetor barrel 26, as shown in FIG. 3.

Figure 2:
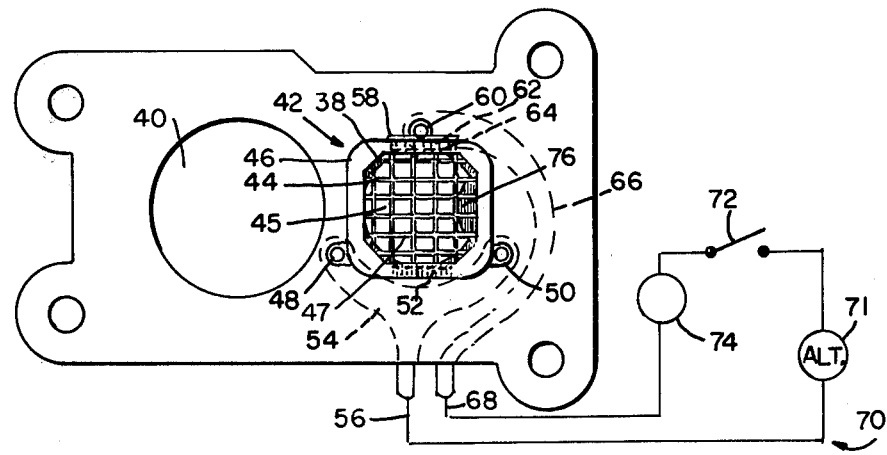
FIG. 2 is a bottom plan view, partly in schematic, of a component of the apparatus shown in FIG. 1.

Mounted below the insulator aperture 38 is a multi-passaged PTC heater 42 as shown in FIGS. 1, 2 and 3.

The PTC heater 42 includes a multi-passaged PTC heating element or resistor 44 which is housed in a metal frame 46, having conductive metal tabs 48 and 50, as shown in FIG. 2. The PTC grid resistor 44 is spaced from the frame 46 so as to be out of electrical contact therewith except where such contact is made by leaf springs 52 between the resistor 44 and the frame 46, the tabs 48 and 50, the flat conductive junction plate 54 and the conductive lead 56, all of which form the ground conductive path for the PTC heater 42, as shown in FIG. 2.

For the positive conductive path, a slotted insulative block 58 is mounted in the heater frame 46 and has mounted thereon a conductive tab 60, which electrically connects with conductive member 42 which in turn makes electrical contact with the PTC resistor 44 by way of leaf springs 64, mounted to such conductive member 62, as shown in FIG. 2.

The PTC grid 44 is accordingly electrically connected with the conductive tab 60 and in turn, with flat conductive strip 66, sandwiched in the insulator assembly 12, the strip 66 then connecting with the conductor 68 to define the positive conductive path of the PTC heater 42, as shown in FIG. 2.

The conductive junction plate 54 and the conductive strip 66 are sandwiched between insulative layers 55 and 57 shown in FIG. 3, of the insulator assembly 12.

The leads 56 and 68 are electrically connected across a circuit 70 which includes a power source e.g. a 12-volt DC automotive battery or preferably a (14 volt DC) automotive alternator 71 and a switch which can be an automotive ignition switch, but preferably is a secondary switch 72, as shown in FIG. 2, which latter switch closes preferably just after the the automotive engine is started. Further provided in the circuit 70 is a current interrupter means 74, e.g. a thermostat or timer which shuts off the current to the PTC resistor when the automotive engine has heated to sufficiently heat the fuel-air mixture pasing from the carburetor to the engine manifold. As shown in FIGS. 1, 2 and 3, the PTC heater 42 is mounted in spaced proximity below the insulator assembly 12, across the aperture 38 thereof and in the flow the fuel-air mixture as it flows into the manifold 14, as shown or indicated in FIGS. 1, 2 and 3.

In accordance with the invention, a redirection means is disposed in the flow of the fuel-air mixture proximate the heater 42. According to the illustrated embodiment, this means comprises a redirection member in the form of a tab 76 mounted above the PTC heater 42 and below the carburetor 10. Tab 76 projects into the insulator aperture 38 and, thus, into the flow of the fuel-air mixture passing therethrough; see FIGS. 1, 2 and 3. Preferably, the tab 76 is a cut-out portion of the insulator assembly 12 as shown in FIG. 1.

The tab 76, although of uncomplicated construction, provides several benefits which lead to improved and more efficient burning of the fuel-air mixture. For example, tab 76 provides a venturi effect which speeds up the flow of the fuel-air mixture through the insulator aperture 38 and, thus, adds turbulance to such flow to cause further mixing of the components thereof. Of particular significance, tab 76 diverts or redirects the so-mixed flow from its former path to a desired path into the engine manifold e.g. centrally of such manifold for more uniform distribution of the fuel-air mixture into the respective combustion chambers 78, 80, 82 and 84, for improved combustion efficiency thereof, as shown or indicated in FIGS. 1 and 3. More specifically, the tab provides a "baffle effect" which redirects the fuel-air mixture from its former path from the carburetor 10, as shown by the arrows 86, through the PTC heater (for heating and further vaporization thereof) to a desired or more efficient path as shown by the arrows 88 into the engine manifold 14, as shown in FIG. 1.

In operation, the air, indicated by arrows 90, flows into the venturi 20 of the carburetor 10, as controlled by the pivotable choke valve 28 mounted in the air inlet port 30, while the fuel, e.g. gasoline, flows into the venturi 20 through the fuel line 32, as indicated by the arrow 92, as shown in FIG. 3. The thus-formed fuel-air mixture is drawn (by engine suction) through the venturi 20 for further mixing in the primary carburetor barrel 24, as shown in FIG. 3, past a throttle valve 34, through the aperture 38 of the insulator assembly 12, as deflected by the redirection tab 76 in such aperture for further mixing thereof and through the passages 45 of the PTC heating element 44, where the fuel-air mixture is heated for further vaporization thereof, the so-heated mixture being diverted in a desired path into the engine manifold, for improved distribution thereof, as shown or indicated in FIGS. 1 and 3.

As previously indicated, the PTC heater 42 can be energized by the switch 72 and powered by the automotive alternator 71, as shown in FIG. 2. When the engine 16, FIG. 3, has sufficiently warmed to an operational temperature, the thermostat or timing means 74 interrupts the flow of current to the PTC heater 42 and the fuel-air mixture continues flowing through the primary carburetor barrel 24 and through the deactivated PTC heater 42 as before, as shown in FIGS. 1 and 3. However, though the PTC heater 42 be inactivated the redirection tab 76 of the invention continues its work of mixing and diverting the fuel-air mixture in a desired path into the manifold 14, as before. The fuel-air mixture accordingly flows through the primary barrel of the carburetor 10 and in the path illustrated e.g. by arrows 86 and 88 much or most of the time during the operation of the motor vehicle. At times, however, when the vehicle is accelerated, the throttle valve 36 in the secondary barrel 26 of the carburetor 10 opens and a considerable quantity of the fuel-air mixture flows into the engine without the benefits of redirecting and preheating described above. When the acceleration period is over, the throttle valve 36 is closed and the fuel-air mixture resumes its flow through the primary barrel 24 of the carburetor 10, as above described in connection with FIGS. 1 and 3.

Advantageously, the PTC heating element 44 is spaced a distance below the insulator assembly 12 and its aperture 38 which provides an interval between the redirection tab 76 and such heating element 44, which provides turbulance mixing room for the so-deflected fuel-air mixture for further mixing before it passes through such heating element 44 for improved heating and vaporization thereof. However, if desired, the PTC heating element 44 can be placed in close proximity or adjacent such insulator assembly 12 and the redirection tab 76, if desired, within the scope of the present invention. Accordingly, the redirection member embodying the present invention, serves to further mix the fuel-air mixture as it approaches the PTC heater and then redirect such mixture after it passes through such heater to obtain a desired distribution of such mixture in the engine manifold. Such redirection of the fuel-air mixture into the engine manifold can provide for uniform distribution of such mixture in the respective combustion chambers thereof, enabling the engine to run smoother and more efficiently with reduction of unburned polutants in the exhaust emissions thereof. Further the uncomplicated design of such redirection member can be readily produced in mass production.

The redirection member of the present invention projects into the flow of the fuel-air mixture a sufficient amount to obtain the required diversion of such flow. Preferably, the redirection member embodying the present invention extends into such flow so as to occupy from 2% to 9% of the cross-sectional or venturi area, and more preferably occupies from 5% to 8% thereof.

The redirection means embodying the invention can be a baffle member mounted in the flow of the fuel-air mixture (from a carburetor through a PTC heater to an engine manifold), the baffle being mounted on either side of such PTC heater and proximate thereto. Such baffle can be e.g. a plate projecting at an angle into the flow of such fuel-air mixture to deflect or redirect the same as desired. Such baffle plate can have a rounded or angular periphery or a combination thereof.

Figure 4:
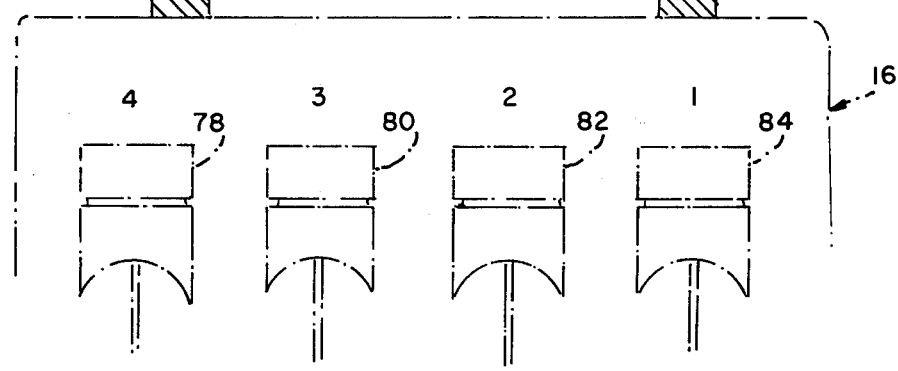
FIGS. 4 and 5 are plan views of alternate component embodiments of the apparatus of the present invention.
Figure 4:
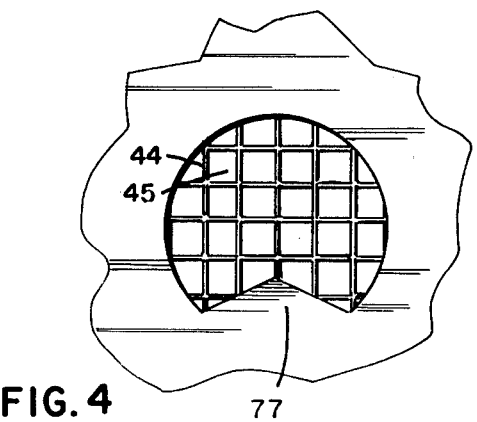
Figure 5:
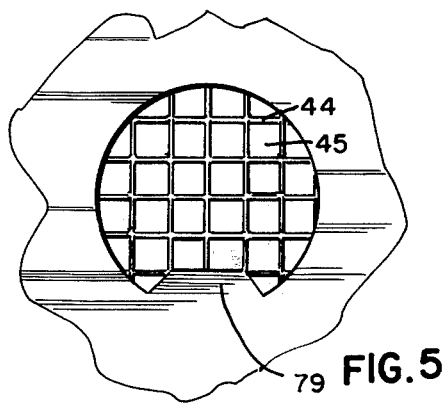

Preferably, the redirection member of the invention is a tab mounted on the upstream side of the PTC heater and projecting into the flow of the fuel-air mixture. Such tab can have a rounded periphery such as tab 76 shown in FIGS. 1 and 3, can have an angular periphery such as tab 77 shown in FIG. 4 and tab 79, shown in FIG. 5, or such tab can be rounded and angular within the scope of the present invention. The shape of the tab is governed by the amount of redirection or deflection to be applied to the air-fuel mixture which in turn will be affected by e.g. how much off-center the PTC heater is mounted relative to the manifold or the relative location of the respective combustion chambers or cylinders of the engine being supplied with such fuel-air mixture.

The redirection member embodying the invention, e.g. the above described tab can be of various thicknesses, uniform or non-uniform including bevelled toward the periphery thereof. Further, the above tab can be mounted at various angles with the flow of the fuel-air mixture including pitched in the direction of the above flow or mounted at substantially a 90° angle therewith or at a greater or lesser angle as desired within the scope of the invention.

Such tab 76 if mounted on cover side, and enough space is allowed to create proper flow and turbulence, can have the thickness of the insulator member 12, as shown in FIG. 3. Preferably, however, such tab is undercut to remove the thickness of the insulative layer 57, as outlined by dotted line 81, as shown in FIG. 3. Such undercut tab provides greater room for turbulence, mixing and heating of the fuel-air mixture as it flows by and around such tab through the PTC resistor.

The redirection member can be made of various durable materials, e.g. metal, plastic or an insulative material. In one example, such redirection member can be a metal tab mounted to or an integral part of the PTC heater frame e.g. frame 46 shown in FIG. 2. More specifically, the frame tab should be disposed between the grid resistor 44 and the insulator member 12, with an air spacing of at least about $\frac{1}{8}$ inch between the grid and tab to create the proper air flow and turbulence. Preferably, however, the redirection member is a tab of insulative material such as a phenolic or of a vegetable fiber material with an epoxy coating thereon, positioned proximate the PTC heating element, which tab can be attached to or more preferably, extend out of, the insulator assembly which supports the PTC heater e.g. the insulator assembly 12, shown in FIG. 1. However such redirection member can be mounted in the flow of the fuel-air mixture separate from such insulator assembly e.g. mounted on the PTC heater frame or mounted on the intake manifold if desired, within the scope of the present invention.

The redirection member embodying the invention can be mounted proximate a PTC heater in registration with the discharge port of a single barrelled carburetor, in registration with a primary barrel of a multi-barrelled carburetor, e.g. as indicated in FIGS. 1 and 3, or such PTC heater and proximate redirection member can be each mounted in registration with a plurality of barrels of a multi-barrelled carburetor within the scope of the present invention.

The redirection member of the invention is mounted proximate the heating element including adjacent thereto or preferably in spaced proximity therewith; e.g. from adjacent to such heating element up to $\frac{1}{2}$ inch (preferred), to 1 inch or more depending on the flow rate of the fuel-air mixture and the amount of deflection desired.

In one example, the redirection member is a tab $\frac{1}{8}$ inch thick, which extends from the insulation assembly 12, as shown in FIGS. 1 and 3, in which the heating element is a PTC resistor grid mounted about $\frac{1}{4}$ inch from the tab.

The PTC heating element described above can be replaced by various other fuel-air mixture preheaters, e.g. an electric wire heater or no heater, if desired, within the scope of the invention. Preferably the redirection member embodying the invention is mounted upstream of a multi-passaged PTC heating element, in spaced proximity therewith as aforesaid.

PTC heaters are known in the art and, for further information, reference can be had to the aforementioned U.S. Pat. Nos. 4,141,327 and 4,108,125. Further, the PTC heater 42, shown in FIG. 2 and described at length above, is further described in copending patent application Ser. No. 260,669, filed May 7, 1981 and, entitled PTC SURFACE DEFOGGER AND DEFROSTER.

The PTC heating element has a plurality of open-ended passages therethrough, which passages can be round or angular in cross-section or a combination thereof and which are preferably grid-shaped as shown in FIG. 2. For example, the resistor 44, shown in FIG. 2, has a plurality of open-ended passages 45 therethrough, bounded by partition walls 47. Such passages are rectilinear and form a grid having a high surface to volume ratio. As indicated in FIGS. 1 and 3, the PTC heating element 44 is positioned so that its passages align with the flow of the fuel-air mixture to accommodate such flow therethrough.

A heating element employed in the present invention, as indicated, is a multi-passaged PTC resistor, which resistor is formed of one or more electrically conductive materials having a positive temperature coefficient (PTC) of electrical resistivity, including electrically conductive ceramic material as hereinafter described. When electric current is directed through such PTC resistor, it becomes heated and displays increasing resistivity until an anomaly temperature is reached, after which there is a steep or anomalous increase in electrical resistivity and the current therethrough is markedly reduced and the rate of heat generation by such resistor is reduced and a stabilization temperature can be reached. Thus, the PTC resistor employed in the apparatus of the invention can serve as a current-limiting device and as a self-regulating heater.

Accordingly, the material used in such PTC resistor is chosen to display a sharp or anomalous increase in resisitivity, at a selected anomaly temperature, to stabilize heating of such resistor at a desired temperature while also reducing the current therethrough to a low level at such stabilizing temperatures. The stabilizing temperature is usually a few degrees above the anomaly temperature e.g. 1° C. to 10° C. thereabove. For the heating means of the apparatus of the present invention, an anomaly temperature of between 160° C. to 180° C. and preferably from 165° C. to 175° C. is desireable but other temperatures can be employed, as desired, within the scope of the invention.

The heating element or PTC resistor employed in the apparatus of the invention preferably includes a conductive ceramic material, e.g. barium carbonate, barium titanate, titanium dioxide, silicon dioxide and the like or combinations thereof, with small amounts of material e.g. manganese, lead and/or lithium and members of the lanthamide series (rare earth elements) including lanthanum, added to adjust the anomaly temperature thereof as desired. Such material when shaped and sintered by methods known in the art, harden to become a conductive ceramic heating element which operates as a PTC resistor. Preferably, the PTC resistor employed is a multi-passaged grid made of barium titanate doped with e.g. 0.035 mole % of an additive selected from the group consisting of manganese, lead, lithium, lanthanum, and mixtures thereof, to provide such element with the desired anomaly temperature.

While there have been shown and described what are at present considered the preferred embodiments of the invention, it will be obvious to those skilled in the art that various changes and modifications may be made therein without departing from the scope of the invention as defined by the appended claims.

We claim:

1. In an apparatus for preheating an air-fuel mixture mounted in the flow of said mixture between a carburetor and the intake manifold of a combustion engine including a PTC resistor heating element having a plurality to open-ended passages positioned to accommodate the flow of said mixture therethrough into said intake manifold, said PTC resistor heating element having means for directing electrical current therethrough whereby said open-ended passages of said resistor are heated to heat said air-fuel mixture passing therethrough, the improvement comprising a redirection means disposed in said flow upstream of said open-ended passages of said resistor, said redirection means causing turbulance in said flow of said mixture to provide further mixing thereof and redirecting said flow of said mixture through said open-ended passages of said resistor into said manifold to obtain a desired distribution of said mixture therein.

2. The apparatus of claim 1 wherein said redirection means comprises a tab member projecting into said flow of said air-fuel mixture.

3. The apparatus of claim 1 wherein said redirection means is positioned upstream of said PTC resistor heating element at a spaced distance therefrom.

4. The apparatus of claim 1 wherein said PTC resistor heating element is in the form of a multi-passaged grid.

5. The apparatus of claim 1 further including an apertured insulator member mounted between said carburetor and said intake manifold, said PTC resistor heating element being mounted across an aperture located in said insulator member.

6. The apparatus of claim 5 wherein said PTC resistor heating element is mounted on the downstream side of said insulator member at a spaced distance therefrom.

7. The apparatus of claim 1 wherein said PTC resistor heating element is mounted off-center relative to the opening into said intake manifold.

8. The apparatus of claim 5 wherein said redirection means is a portion of said insulator member which projects into said aperture of said insulator member to define a tab member.

9. The apparatus of claim 8 wherein said tab member has a rounded edge.

10. The apparatus of claim 8 wherein said tab member possess an angular periphery.

11. The apparatus of claim 8 wherein said tab member possesses a thickness which is bevelled toward the periphery of said member.

12. The apparatus of claim 8 wherein said tab member is mounted at an angle relative to the flow of said air-fuel mixture.

13. The apparatus of claim 1 wherein said PTC resistor heating element is comprised of PTC materials having an anomaly temperature of between 160° C. and 180° C.

14. The apparatus of claim 13 wherein said PTC material comprises a conductive ceramic material selected from the group consisting of barium carbonate, barium titanate, titanium dioxide, silicon dioxide and combinations thereof.

15. The apparatus of claim 8 wherein said tab member occupies from 2% to 9% of the cross-sectional area of said flow.

16. The apparatus of claim 15 wherein said tab member has an undercut portion on the side thereof facing said PTC resistor heating element.

* * * * *